No. 771,346. PATENTED OCT. 4, 1904.
L. WILSON.
PROTECTIVE DEVICE FOR PARALLEL FEEDERS.
APPLICATION FILED NOV. 2, 1903.
NO MODEL.
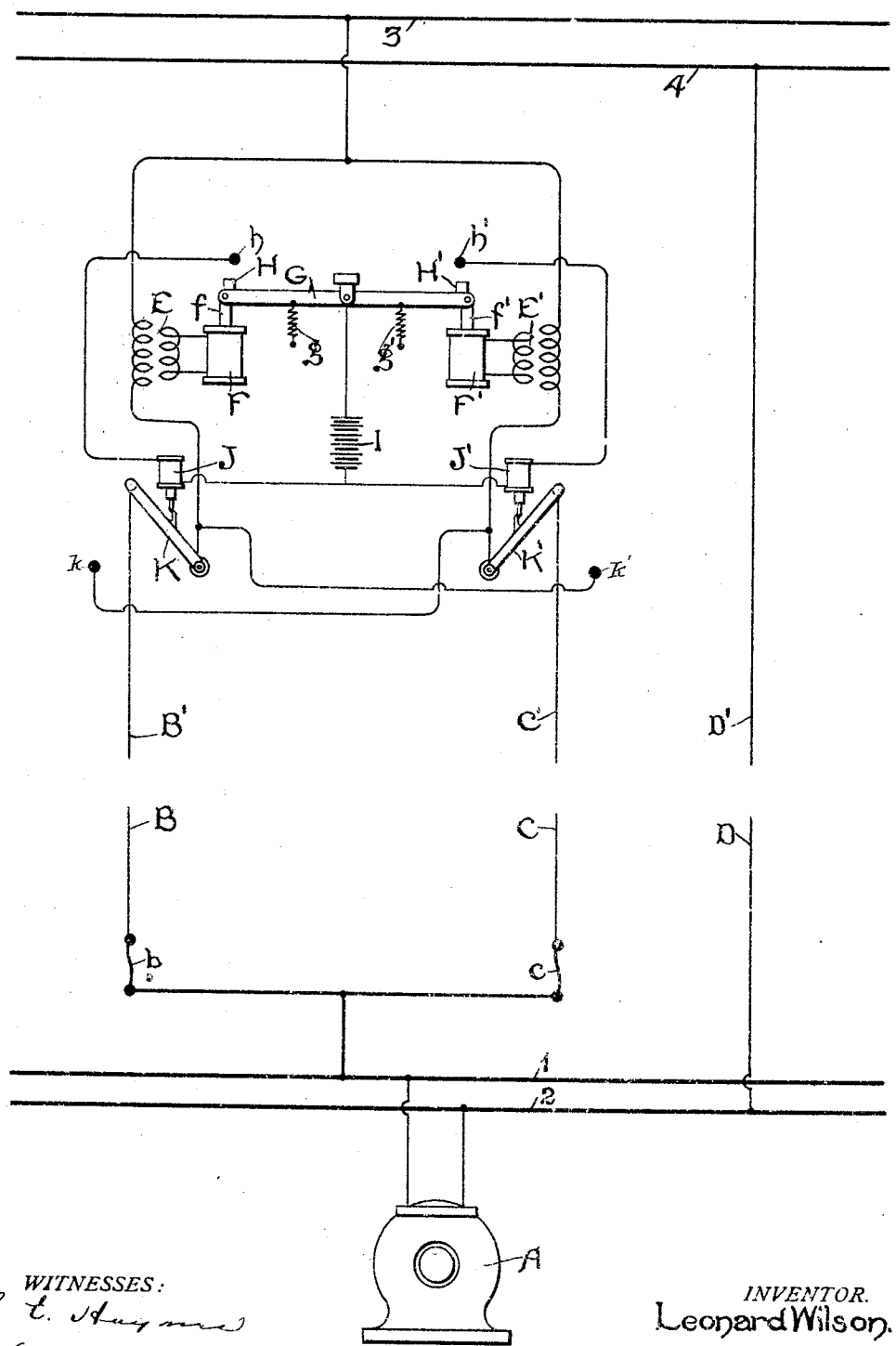
WITNESSES:
INVENTOR.
Leonard Wilson.
BY
L. A. Hawkins
ATTORNEY.

No. 771,346.

Patented October 4, 1904.

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

PROTECTIVE DEVICE FOR PARALLEL FEEDERS.

SPECIFICATION forming part of Letters Patent No. 771,346, dated October 4, 1904.

Application filed November 2, 1903. Serial No. 179,492. (No model.)

*To all whom it may concern:*

Be it known that I, LEONARD WILSON, a subject of the King of England, and a resident of Pittsfield, Massachusetts, have invented certain new and useful Improvements in Protective Devices for Parallel Feeders, of which the following is a specification.

My invention relates to protection for parallel feeders, and is especially applicable to high-tension alternating-current systems, although it is not limited in application to such systems. Where a number of feeders are connected in parallel both at the generating and at the receiving end, it is essential in order to secure safe and continuous operation that any one feeder if it becomes short-circuited should be disconnected from the healthy feeders both at the generating and at the receiving end; otherwise, even though the faulty feeder is disconnected at the generating end, the short-circuit will be maintained through the healthy feeders, which are connected to the fault at the receiving end. Heretofore protective devices for systems employing parallel feeders have been devised which depend for their operation upon the relative potential of the parallel feeders, the lowering of the potential on the grounded feeder being taken advantage of in apparatus designed to cut it out. On systems of high potential such protective devices are very expensive, since they involve the use of potential transformers or other apparatus which must be designed to withstand the potential of the system.

The object of my invention is to provide means for protecting parallel feeders which shall be equally applicable to high and low tension systems and which while positive and efficient in action shall be simple and economical to install.

In the accompanying drawing, A represents an alternating-current generator connected to the station bus-bars 1 2.

B C represent two feeders connected in parallel through fuses or other protective devices $b$ $c$ to the station bus-bar 1.

D represents a feeder of the opposite polarity connected to station bus-bar 2. Although D is represented by a single line in order to avoid complication of the drawing, it will be understood that a plurality of parallel feeders may be used for both polarities of the transmission system and that the line D may represent a reduplication of the feeders B C. B', C', and D' represent the receiving ends of these feeders. B' and C' are connected in parallel to the receiving bus-bar 3, and feeder D' is connected to the receiving bus-bar of opposite polarity 4. E E' represent the series transformers, the primaries of which are inserted in feeders B' and C', respectively. The secondaries of transformers E E' are connected to the solenoids F F'. The cores or plungers $f$ $f'$ of solenoids F F' are carried at opposite ends of the pivoted bar G, which is held normally in the position shown in the drawing by the springs $g$ $g'$. If, however, the current in one feeder exceeds that in the other, the pull upon one of the solenoids $f$ $f'$ will be greater than the pull on the other. Pivoted bar G will consequently be rotated. Bar G carries the contacts H H', which when the bar is tilted make contact with the stationary contacts $h$ $h'$, respectively. When either of the movable contacts H H' is in contact with its stationary contact $h$ or $h'$, as the case may be, a circuit is completed through the battery or other source of current I and one of the solenoids J or J'. Solenoids J and J' operate as tripping-coils for the switches K and K', which are adapted to open the circuit of feeders B' and C', respectively.

The operation of the system is as follows: Assume the system to be supplying current to the receiving bus-bars 3 4 and whatever translating device may be connected thereto. Now suppose feeder C becomes short-circuited by a ground or other disturbance on the line which connects it to feeder D. The fuse or other protective device $c$ will open the circuit of feeder C at the generating end. Current will also flow through feeder B to the receiving end of the line and back through feeder C' to the fault. The primary of series transformer E will now be carrying a larger current than the primary of series transformer E', since the primary of transformer E is carrying not only the short-circuit current, which flows through transformer E', but also the load-current, which flows to the bus-bars 3 4. Consequently solenoid F will exert a greater pull upon its core than solenoid F'. The left-hand end of bar G will be depressed and contact H' will engage stationary contact $h'$. The circuit will then be completed through the source of current I and solenoid J'. Switch K' will accordingly be tripped and will fall, opening the circuit of feeder C and making engagement with the stationary contact $k'$. Stationary contact $k'$ is cross-connected to feeder B', and consequently switch K' places the primary coils of the series transformers E E' in parallel in the feeder B'. The pull of the solenoids F F' is now equalized and bar G returns to its central position under the influence of springs $g\ g'$. Thus the faulty feeder is cut out both at the generating and receiving ends and continuity of service is preserved.

I have shown my invention as applied to alternating-current systems, since it is especially applicable to high-potential lines, and accordingly I have shown the differential device connected to the feeders through series transformers. It will be understood, however, that I am in no way limited to alternating-current systems. My invention is equally applicable to parallel feeders carrying direct current. Moreover, I have shown my invention as applied to a single-phase alternating-current system. It is evident that it may be applied with equal facility to an alternating-current system of any number of phases. Accordingly I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination, parallel feeders, a movable member, opposing windings adapted to pull said member in opposite directions and arranged to be energized by the currents in the respective feeders, and switches controlled by said member and adapted to open the circuit of the feeder carrying the smaller current.

2. In combination, parallel feeders, a differential electromagnetic device responsive to a difference in the amounts of current-flow in said feeders and independent of the relative directions of said currents, and a switch adapted to be operated by said device and to open the circuit of the feeder carrying the smaller current.

3. In combination, parallel feeders, magnet-windings arranged to be energized by the currents in said feeders, a movable member comprising two magnetic cores and adapted to be drawn in opposite directions by said windings, and a switch adapted to be operated by said member.

4. In combination, parallel feeders, magnet-windings arranged to be energized by the currents in said feeders, a movable member adapted to be drawn in opposite directions by said windings, and a switch adapted to be operated by said member and to open the circuit of a feeder and to connect its magnet-winding to another feeder.

5. In combination, parallel feeders, magnet-windings arranged to be energized by the currents in said feeders, a movable member comprising two magnetic cores and adapted to be drawn in opposite directions by said windings, a local circuit arranged to be closed by the movement of said member, a tripping-coil in said local circuit, and a switch operated by said tripping-coil.

6. In combination, parallel feeders, an electroresponsive device, means for causing the currents in said feeders to produce opposing forces in said device, and a switch controlled by said device and arranged to open the circuit of the feeder carrying the smaller current.

7. In combination, parallel feeders, overload cut-outs at the generating end of said feeders, and a differential device at the receiving end of said feeders arranged to open the circuit of the feeder carrying the smaller current after the operation of one of said overload cut-outs.

Signed at Pittsfield, Massachusetts, this 28th day of October, 1903.

LEONARD WILSON.

Witnesses:
L. A. HAWKINS,
R. E. HAYNES.